United States Patent
Mathews

(10) Patent No.: US 12,124,442 B2
(45) Date of Patent: Oct. 22, 2024

(54) ARTIFICIAL INTELLIGENCE-BASED RESOURCE MANAGEMENT OF COMPUTING SYSTEMS AND COMPLEX DATABASE SYSTEMS

(71) Applicant: Teradata US, Inc., San Diego, CA (US)

(72) Inventor: Felix Mathews, San Diego, CA (US)

(73) Assignee: Teradata US, Inc., San Diego, CA (US)

( * ) Notice: Subject to any disclaimer, the term of this patent is extended or adjusted under 35 U.S.C. 154(b) by 0 days.

(21) Appl. No.: 18/088,514

(22) Filed: Dec. 23, 2022

(65) Prior Publication Data

US 2024/0211474 A1    Jun. 27, 2024

(51) Int. Cl.
*G06F 16/00* (2019.01)
*G06F 11/34* (2006.01)
*G06F 16/2453* (2019.01)

(52) U.S. Cl.
CPC ...... *G06F 16/2453* (2019.01); *G06F 11/3419* (2013.01)

(58) Field of Classification Search
CPC .................................................. G06F 16/2453
See application file for complete search history.

(56) References Cited

U.S. PATENT DOCUMENTS

| | | | | |
|---|---|---|---|---|
| 7,693,847 B1* | 4/2010 | Brown | ........... | G06F 9/5038 |
| | | | | 707/694 |
| 8,745,032 B1* | 6/2014 | Brown | ........... | G06F 16/2453 |
| | | | | 707/812 |
| 9,489,630 B2* | 11/2016 | Achin | ........... | G06N 5/02 |
| 9,747,334 B2* | 8/2017 | Burger | ........... | G06F 16/2453 |
| 2023/0244535 A1* | 8/2023 | Front | ........... | G06F 11/3447 |
| | | | | 718/104 |
| 2023/0317256 A1* | 10/2023 | Tomer | ........... | G06Q 10/06311 |
| | | | | 705/7.13 |

FOREIGN PATENT DOCUMENTS

WO    WO-2021077059 A1 *  4/2021  ....... G06Q 10/06311

* cited by examiner

*Primary Examiner* — Noosha Arjomandi
(74) *Attorney, Agent, or Firm* — Randy L. Campbell, Jr.

(57) ABSTRACT

Artificial Intelligence-based (AI-based) modeling can be used to predict "Critical Times" when "bottlenecks" in a processing of data would occur. Moreover, for each one of the predicted Critical Times, it can be determined which one of multiple Computing Resources would cause the bottleneck, so that more precise measures can be taken and taken before a Critical Time, in an effort to prevent bottlenecks from happening in computing systems, especially more complex database systems with more demeaning service needs and requirements.

20 Claims, 14 Drawing Sheets

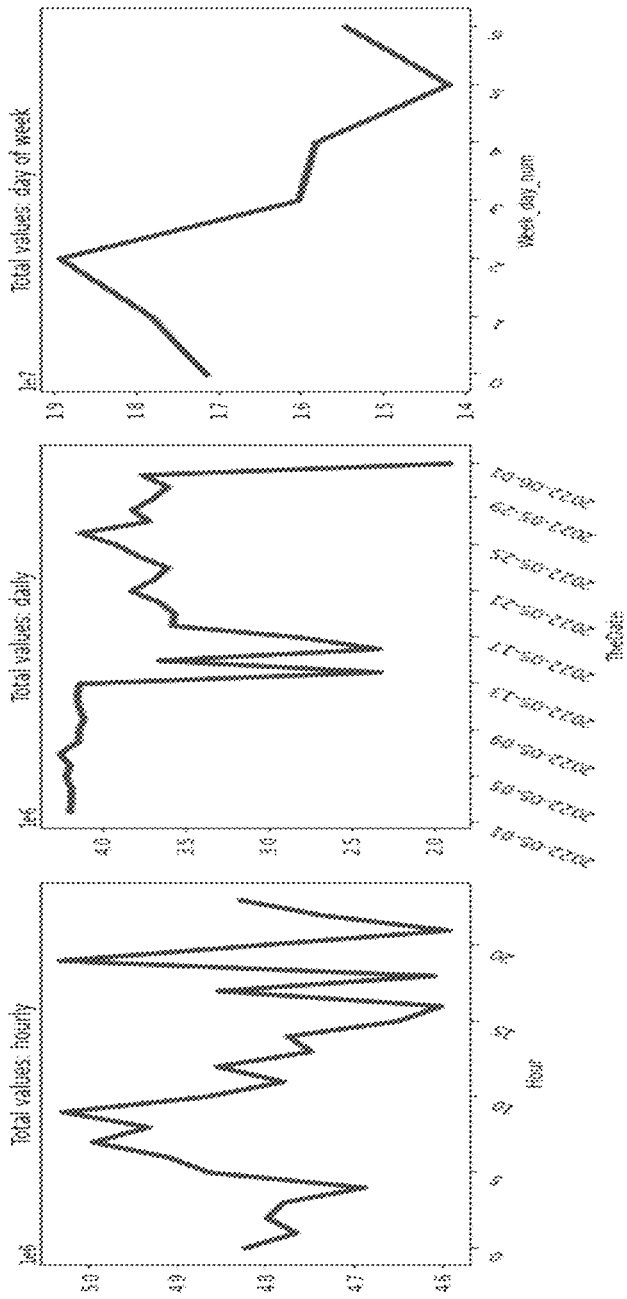

ARTIFICIAL INTELLIGENCE-BASED RESOURCE MANAGEMENT OF COMPUTING SYSTEMS AND COMPLEX DATABASE SYSTEMS

BACKGROUND

In the context of computing environments and systems, a "Computing Resource" (or system resource, or simply resource) can, for example, be a physical, or virtual component of typically limited availability within a computer environment and/or system. Typically, Computing Resources include processing resources (e.g., physical processors and virtual processors or units) and memory resources of a computing system or environment (e.g., cache memory, CPU cache memory, Input/Output (I/O) based components).

One important aspect of computing environments and systems is management of their resources (Computing Resource Management or Resource Management). Resource Management can refer to techniques for managing Computing Resources that are typically limited. Resource Management can be especially important to database systems that can typically be provided as a highly complex and/or specialized computing system designed to process database queries of the data stored in a database. As a result, database systems can have highly complex and/or specialized Resource Management mechanisms. As such, database systems can serve as a good example and an introduction of database systems will be discussed below before resuming a more general discussion of computing systems, more particularly, their resource usage.

In the context of computing environments and systems, data can encompass virtually all forms of information. Data can be stored in a computer readable medium (e.g., memory, hard disk). Data, and in particular, one or more instances of data can also be referred to as data object(s). As it is generally known in the art, a data object can for example, be an actual instance of data, a class, type, or form data, and so on.

The term database can refer to a collection of data and/or data structures typically stored in a digital form. For example, data can be stored in a database for various reasons and to serve various entities or "users." Generally, data stored in the database can be used by the database users. A user of a database can, for example, be a person, a database administrator, a computer application designed to interact with a database, etc. A very simple database or database system can, for example, be provided on a Personal Computer (PC) by storing data on a Hard Disk (e.g., contact information) and executing a computer program that allows access to the data. The executable computer program can be referred to as a database program or a database management program. The executable computer program can, for example, retrieve and display data (e.g., a list of names with their phone numbers) based on a request submitted by a person (e.g., show me the phone numbers of all my friends in San Diego).

Generally, database systems are much more complex than the example noted above. In addition, database systems have evolved to a great extent over the recent years. Today, database systems are provided for various businesses and organizations (e.g., banks, retail stores, governmental agencies, universities). The existing database systems can be very complex and can support several users simultaneously, by processing very complex queries (e.g., list the names of all customers under the age of thirty-five (35) currently residing in Ohio that have bought at least one ticket for a baseball game in San Diego and purchased a baseball in the past ten (10) years).

Typically, a Database Manager (DM) or a Database Management System (DBMS) is provided for relatively large and/or complex databases. As known in the art, a DBMS can effectively manage the database or data stored in a database, and serve as an interface for the users of the database. A DBMS can be provided as an executable computer program (or software) product as is also known in the art.

It should also be noted that a database can be organized in accordance with a Data Model. Notable Data Models include a Relational Model, an Entity-relationship model, and an Object Model. The design and maintenance of a complex database can require highly specialized knowledge and skills by database application programmers, DBMS developers/programmers, database administrators (DBAs), etc. To assist in design and maintenance of a complex database, various tools can be provided, either as part of the DBMS or as free-standing (stand-alone) software products. These tools can include specialized Database languages (e.g., Data Description Languages, Data Manipulation Languages, Query Languages). Database languages can be specific to one data model or to one DBMS type. One widely supported language is Structured Query Language (SQL) developed, by in large, for Relational Model and can combine the roles of Data Description Language, Data Manipulation language, and a Query Language.

Today, databases have become prevalent in virtually all aspects of business and personal life. Moreover, database use is likely to continue to grow even more rapidly and widely across all aspects of commerce. Generally, databases and DBMS that manage them can be very large and extremely complex partly in order to support an ever-increasing need to store data and analyze data. Typically, larger databases are used by larger organizations. Larger databases are supported by a relatively large amount of capacity, including computing capacity (e.g., processor and memory) to allow them to perform many tasks and/or complex tasks effectively at the same time (or in parallel). On the other hand, smaller databases systems are also available today and can be used by smaller organizations. In contrast to larger databases, smaller databases can operate with less capacity.

A popular type of database is the Relational Database Management System (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

One important aspect of database systems is various database operations that they support and optimization of the database queries of the data stored in the database, as it is generally appreciated by those skilled in the art. One such database operation is generally known as a database Join operation (or "Join" as also may be referred to herein). For example, in a SQL environment, a SQL Join statement can be used to combine data or rows from two or more tables based on a common field between them. Different types of Joins include, INNER JOIN, LEFT JOIN, RIGHT JOIN and FULL JOIN. Simply put a Join operation can be used to effectively combine the information provided in database (e.g., as database tables) to address database quarriers. For example, in a database where a first database table provides information about students and their age, a second database table that provides information about the students and their favorite subjects and a third database that provides information about the students and their respective Grade Point Averages (GPA's), join operations can be suggestively applied to the tables to effectively join their information to address various database queries, including, for example, finding all the students that are age 19 with a GPA of 3.5 or higher that have "math" as their favorite subject, and so on.

A more recent development in database systems is the use of multi-processing computing or parallel computing system, especially Massively Parallel Processing (MPP) database systems that use a relatively large number of processing units to process data in parallel.

Another more recent development is the development of modern analytics (or data analytics) methods including, for example, statistical analytics, machine learning methods, discrete mathematics (e.g., graph analytics, deep learning). These modern analytics can be quite complex. As such, MPP database systems, among other things, are relatively much better suited for running (or executing modern analytics (or data analytics) methods.

Partly as a result of a number of more recent developments, there is an ever-increasing need for Relational Databases to process increasingly more and more data for various applications in many existing computing environments and systems. For example, today, in a number of existing database environments, there is a need to execute (or run) thousands of database queries in parallel, or virtually simultaneously. Generally, managing access to data is an important aspect of computing systems. Managing data and access to data has become even more crucial today, especially for database systems that need to process more and more requests to access to data (e.g., database queries).

As noted above, today, database systems can have highly complex and effective Resource Management capabilities (e.g., Teradata Vantage Workload Management available from Teradata Inc.) Nevertheless, in view of an ever-increasing need to process even more data for increasingly more applications and user attempting to access the database system at the same time, even more effective Resource Management techniques would be highly useful.

SUMMARY

Broadly speaking, the invention relates to computing environments and systems. More particularly, the invention relates to improved techniques for management of computing resources of computing systems, including database systems.

The improved techniques provide Artificial Intelligence (AI) based modeling that can be used to predict "Critical Times" when "bottlenecks" in a processing of data would occur. Moreover, for each one of the predicted Critical Times, it can be determined which one of multiple Computing Resources would cause the bottleneck, so that more precise measures can be taken and taken before a Critical Time, in an effort to prevent bottlenecks from happening in computing systems, especially more complex database systems with more demeaning service needs and requirements.

In accordance with one aspect, multiple AI-based prediction models can be collectively used (e.g., combined on a timeline). The AI-based prediction models can be generated respectively for each one of multiple Computing Resources based on their respective Computing Resource Features (e.g., measurable attributes and/or characteristics).

In accordance with another aspect, the Computing Resource Features can be selected for the AI-based prediction models that would most accurately predict the Critical Times.

In accordance with yet another aspect, feedback loop(s) can be provided based on actual measured resource usage data to generate even more accurate AI-based prediction models and/or take into consideration changes of behavior with respect to usage of resources in a computing system.

In accordance with still another aspect, AI-based prediction models can be generated continually to predict "Critical Times" ahead of time, while actual resource usage is continually measured (e.g., measured at intervals) and provided as feedback to AI-based prediction models. In one embodiment, AI-based prediction models are generated to predict resource usage for a first period of time and during that first period of time actual usage of data is measured and used as feedback to AI-based prediction models to generate predictions for resource usage for a second period of time immediately following the first period of time, and so on. The predictions are used to actively adjust access controls to the Computing Resources as needed with respect to each one of the Computing Resources prior to "bottlenecks" occurring actively, continually, and dynamically to improve the curacy of the predictions and account for changes in behavior with respect to use of the Computing Resources.

Still other aspects, embodiment and advantages will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIGS. 5A and 5B, total measured usage for a feature "CPUOPSYS" and patterns of usage in accordance with one or more embodiments.

FIGS. 6A, 6B, 6C and 6D depict data analysis for feature importance and selection in accordance with one or more embodiments.

DETAILED DESCRIPTION

Figure 1:
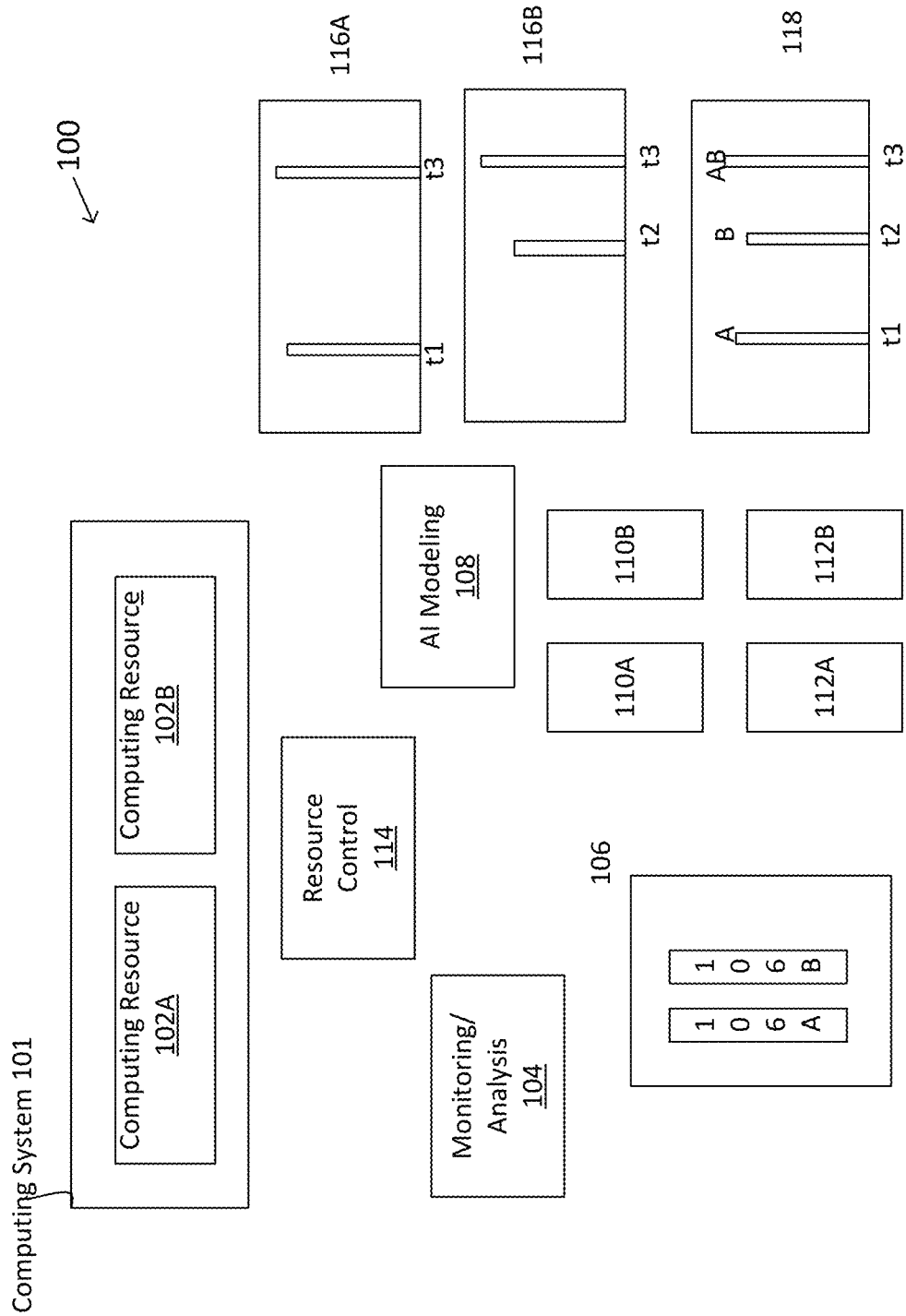
FIG. 1 depicts a computing system in a computing environment in accordance with one embodiment.

As noted in the background section, in view of an ever-increasing need to process even more data for increasingly more applications and users requesting service at the same time, even more effective Resource Management techniques would be highly useful. More generally, improved Resource Management techniques for computing systems would be highly useful given their ever-increasing use and applications in various aspects of life.

Today, there is a need for the Business and Engineering process pipelines in computing systems, including database service pipelines, to operate at optimal levels, without any bottlenecks (or bottle necks) that can effectively be "choking" points in the processing of the pipelines computing systems caused by shortage of computing resources (or processing pipeline resources). However, conventionally, the "choking points" of the processing are not predicted ahead of time Another more recent development is advancement and application of Artificial Intelligence (AI). AI can refer to theory and development of computing systems able to perform tasks that normally require human intelligence, such as visual perception, speech recognition, decision-making, and translation between languages (see, for example, the Oxford Dictionary). AI encompasses Machine Learning (ML) as the use and development of computer systems that are able to learn and adapt without following explicit instructions, by using algorithms and statistical models to analyze and draw inferences from patterns in data (or pattern recognition).

Although Artificial Intelligence (AI) may have been used to manage Computing Resources in computing systems including database systems. By and large, these conventional uses of AI have been relatively unsophisticated, coarse (not fine-grained) and/or static. In particular, conventionally, AI models used for Computing Resource Management either train and predict classifications, or train and predict timeseries, with respect to management of Computing Resources in computing systems.

In view of the existing approaches, it appears that there is still a need for more sophisticated and more active uses of AI for deplanement of even more effective resource management techniques for managing the computing resources of computing systems, especially, more complex database systems with highly demanding resource management requirements. One exemplary database resource management system is provided by the Teradata Vantage Workload Manager as highly complex resource management system described, for example, in Teradata Vantage Workload Manager User Guide, Release 16.20, published On March 2019, which is hereby incorporated by reference herein.

It will be appreciated that more recent advanced AI maturity could make use of multi-feature classification to forecast "choking points" (or "critical" times) of the processing pipelines ahead of time, while a time-series analysis could further forecast more specific utilization of each computing resource in the processing pipeline. As a result, an advanced AI-based combination of (i) choking point forecasting classification and (ii) resource-specific shortage time-series forecasting can be used. In addition, an integrated feedback-loop can be used by the AI-based combination to actively predict and automatically adjust computing resource management controls and to automatically make use of existing computing resource management facilities (e.g., database managers or database work load manager) to proactively adjust access to the computing resources before the choking points in an effort to avoid bottlenecks from happening.

Unlike conventional techniques that train and predict classifications or time-series, a combined intelligence of a master classification-model and over a dozen process pipeline resources forecasted in timeseries can be used to predict "choking" points as points (or intervals) in time "Critical Times") in pipeline processing (or "flow control") and then identify the specific resources causing them. In addition, an automated feedback-loop can take corrective action to actively adjust access to the computing resources before the "Critical Times" in an effort to avoid bottlenecks (or "choking points") from happening.

Improved techniques for management of resources of computing system ("Computing Resources") are disclosed. Among other things, the improved techniques provide Artificial Intelligence (AI) based modeling that can be used to predict "Critical Times" when "bottlenecks" in a processing of data would occur. Moreover, for each one of the predicted Critical Times, it can be determined which one of multiple Computing Resources would cause the bottleneck, so that more precise measures can be taken and taken before a Critical Time, in an effort to prevent bottlenecks from happening in computing systems, especially more complex database systems with more demeaning service needs and requirements.

In accordance with one aspect, multiple AI-based prediction models can be collectively used (e.g., combined on a timeline). The AI-based prediction models can be generated respectively for each one of multiple Computing Resources based on their respective Computing Resource Features (e.g., measurable attributes and/or characteristics).

In accordance with another aspect, the Computing Resource Features can be selected for the AI-based prediction models that would most accurately predict the Critical Times.

In accordance with yet another aspect, feedback loop(s) can be provided based on actual measured resource usage data to generate even more accurate AI-based prediction models and/or take into consideration changes of behavior with respect to usage of resources in a computing system.

In accordance with still another aspect, AI-based prediction models can be generated continually to predict "Critical Times" ahead of time, while actual resource usage is continually measured (e.g., measured at intervals) and provided as feedback to AI-based prediction models. In one embodiment, AI-based prediction models are generated to predict resource usage for a first period of time and during that first period of time actual usage of data is measured and used as feedback to AI-based prediction models to generate predictions for resource usage for a second period of time immediately following the first period of time, and so on. The predictions are used to actively adjust access controls to the Computing Resources as needed with respect to each one of the Computing Resources prior to "bottlenecks" occurring actively, continually, and dynamically to improve the curacy of the predictions and account for changes in behavior with respect to use of the Computing Resources.

Embodiments of some aspects of the improved techniques are also discussed below with reference to FIGS. 1-10. However, those skilled in the art will readily appreciate that the detailed description given herein with respect to these figures is for explanatory purposes as the invention extends beyond these limited embodiments.

FIG. 1 depicts a computing system 101 in a computing environment 100 in accordance with one embodiment. Referring to FIG. 1, a Data Monitoring and Analysis System (DMA) 104 can effectively monitor resource usage of Computing Resources 102A (CRA) and 102B (CRB) of the computing system 101 to generate monitoring data (not shown). In addition, the Data Monitoring and Analysis System (DMA) 104 can analyze the generated monitoring data to generate (or select) Selected Sets of Computing Resource Features (SSCRF 106), namely a first set SSCRF 106A (CRFA's) and a second set SSCRF 106B (CRFB's). A Selected Set of Computing Resource Features 106, can, for example, be selected from a larger set, if not all available features (or characteristics or attributes) associated with the Computing Resources 102A (CRA) and 102B (CRB) of the computing system 101. Typically, a Computing Resource Feature (CRF) is a measurable property or characteristic of its corresponding Computing Resource. In addition, the Computing Resource Feature (CRF) can be used by an Artificial Intelligence based technique (e.g., Machine learning) as a feature to build AI-based models or prediction models. It may also desirable to select a CRF that is a controllable, or manageable property, or characteristic, of a Computing Resource. It should be noted that the selection of the Selected Set of Computing Resource Features (SSCRF 106) may be challenging. By way of example, in a relatively complex and manageable database system, the total number of Computing Resource Features (CRFs) can exceed well over one hundred (100) features. As such, in some database applications, the Data Monitoring and Analysis System (DMA) 104 may employ relatively sophisticated data monitoring and/or data analysis to select the Selected Set of Computing Resource Features (SSCRF 106) from a relatively large number of CRF's. In doing so, as those skilled in the art will readily appreciate, the Data Monitoring and Analysis System (DMA) 104 can, for example, assign a relatively critical importance score based on monitored usage of a CRF and/or an assigned relative weight of importance assigned to a Computing Resource Feature (or feature as may be referred to herein). It should be noted that the sets of Computing Resource Features (CRFs) 106 and 106B can be determined separately, or individually for each one of the Computing Resources 102, namely, Computing Resource 102A (CRA) and Computing Resource 102B (CRB).

Referring still to FIG. 1, the generated Selected Sets of Computing Resource Features (SSCRF 106) can be obtained by an AI Modeling System 108. Again, it should be noted that the set Computing Resource Feature (CRFs) 106 A and 106B can be determined separately, or individually, for each one of the Computing Resource 102A (CRA) and Computing Resource 102B (CRB). As a result, multiple Selected Set of Computing Resource Features (106A and 106B) can be obtained by the AI Modeling System (AIMS) 108. For each one of the Selected Set of Computing Resource Features (106A and 106B) the AI Modeling System 108 can generate a set of Selected Estimation Models (SEM) 110, respectively, namely 110A and 110B, such that an estimation model (or prediction model) 110 can be a prediction of resource usage of its corresponding Computing Resource for a time period in the future. In other words, a set of Selected Estimation Models 110A can be generated for the Computing Resource 102A as predicted estimations of usage of the Computing Resource 102A, such that each estimation is modeled based on one the selected Computing Resource Features 106A, and another a set of Selected Estimation Models 108B can be generated for the Computing Resource 102B as predicted estimations of usage of the Computing Resource 102B, such that each estimation is modeled based on one the selected Computing Resource Features 106B. In addition, for the Selected sets of Estimation Models 110, a set of Actual Resource Usage Data (ARUD) 112, namely, 112A and 112B can be provided, such that each one provides actual usage data (or measured data values) for each one of the Computing Resources 102A and 102B. The measured data values, can for example, by obtained by using the Data Monitoring and Analysis System (DMA) 104 to effectively monitor and measure usage of a Computing Resources for specific time intervals.

Referring still to FIG. 1, a Resource Control System 114 can obtain the set of Selected Estimation Models 110 generated by the AI Modeling System (AIMS) 108, and the Actual Usage Data (AUD) 110, to select at least one of the CRFs as a Target Computing Resource Feature (TCRF) for each one of the Computing Resources 102A and 102B. By way of example, the Resource Control System 114 can ultimately identify (or select) as an Estimation or Prediction Model from the set of Selected Estimation Models (SEM) 110A that most closely matches the actual measured usage for its corresponding Computing Resource, namely the Computing Resource 102A (i.e, most accurate prediction of actual measured data). The Resource Control System 114 can do the same with respect to the Computing Resource 102A to ultimately select a Target Computing Resource Feature (TCRF) as the most accurate perdition for usage of the Computing Resource 102B. As result, Resource-Usage Estimation Models 116A and 116B can be selected or identified, for example, based on their accuracy of prediction of computing resource usage.

As depicted in FIG. 1, a Resource-Usage Estimation Model 116A can effectively identify (or it can be used to effectively identify) one or more "times" (as used herein, time can also be a time interval, a time period) in the future where the predicted usage of the computing Resource 102A is predicted to be above a (desired) threshold causing a (undesirable) "bottle-neck" effect in the processing of the data by the computing system 101. Similarly, Resource-Usage Estimation Model 116A can effectively identify (or it can be used to effectively identify) one or more "times" in the future where the predicted usage of the computing Resource 102B is predicted to be above a (desired) threshold causing a (undesirable) "bottle-neck" effect in the processing of the data by the computing system 101. For example, the Estimation Model 116A can identify times $t_1$ and $t_3$ as "Critical Times' where a "bottle-neck" can adversely affect the processing of the data by the computing system 101 considering or in connection with the Computing Resource 102A, and the Estimation Model 116B can identify times $t_2$ and $t_3$ as "Critical Times' where a "bottle-neck" can adversely affect the processing of the data by the computing system 102 considering or in connection with the Computing Resource 102B.

It will be appreciated that the Resource Control System (RCS) 114 can effectively remediate "bottlenecks", if not fully prevent them from occurring. In doing so, in addition to selecting, or identifying the Resource-Usage Estimation Models 116A and 116B, the Resource Control System (RCS) 114 can effectively combine or integrate them into an Integrated Estimation (or Prediction) Model 118. In the example, Integrated Estimation Model 118 depicts combined or projected estimation over a time line (or x-axis) to identify all "Critical Times," where a "bottleneck" can adversely affect the processing of the data by the computing system 101, namely, at Critical Times $t_1$, $t_2$, and $t_3$. In addition, the Resource Control System (RCS) 114 can determine whether if either one or both of the computing resources 102A and 102B would be responsible for causing a "bottleneck" at a given Critical Time. In the example, at a Critical Time $t_1$, it can be determined that only the Computing Resource 102A (and not 102B) would cause a "bottleneck," so that access control can be adjusted (or readjusted) for access to the Computing Resource 102A (and not 102B) with respect to accessing it at the Critical Time $t_1$ in an effort to avoid the "bottleneck." However, at a Critical Time $t_2$, it can be determined that only the Computing Resource 102B (and not 102A) would cause a "bottleneck," so that access control can be adjusted (or readjusted) for access to the Computing Resource 102B (and not 102A) with respect to accessing it at the Critical Time $t_2$ in an effort to avoid the "bottle-neck." On the other hand, it can be determined that at a Critical Time $t_3$, both of the Computing Resources 102A and 102B would cause a "bottleneck, so in an effort to avoid the "bottleneck," access control for accessing both of the Computing Resource 102A and 102B need to be adjusted (or readjusted) with respect for the Critical Time $t_3$. As such, this information can be used to effectively adjust (or readjust) access controls to a single one or both of the Computing Resources 102A and 102B, as needed, at for each one of the Critical Times (or time intervals) $t_1$, $t_2$ and $t_3$. In other words, when a bottle-neck in processing of the data by the computing system 101 is the identified to occur at a future time, one (1) of three (3) possible cases (or outcomes) can be identified for the given Critical Time: (i) only the first Computing Resource (102A) (associated with a first Computing Resource Feature used to predict its usage) can contribute to causing (or cause) the bottleneck, (ii) only the second Computing Resource (102B) (associated with a second Computing Resource Feature used to predict its usage) can contribute to causing the bottleneck, and (iii) the first Computing Resource (102A) and the second Computing Resource (102B) can both contribute to causing the bottleneck.

Moreover, access control can be changed (or readjusted) prior to an identified Critical Time (e.g., $t_1$) in an effort to prevent the bottleneck from happening. In other words, access control adjustments can be made to one, or both, of the Computing Resources 102A and 102B as needed, prior to each one of the Critical Time $t_1$, $t_2$ and $t_3$. By way of example, access control of the Computing Resources 102 can be set differently at the beginning of the Critical Times $t_1$, $t_2$ and $t_3$, so that it is adjusted only for the first Computing Resource 102A between times $t_1$ and $t_2$, but adjusted only for the second Computing Resource 102B between times $t_2$ and $t_3$, and adjusted for both of the first and second Computing Resources 102A and 102B between times $t_3$ and $t_4$, and so on. It should be noted access control adjustment can be made with respect to one or more of controllable characteristics and/or features of a Computing Resource (102A).

It will also be appreciated that the Resource Control System (RCS) 114 can also be configured to effectively readjust the Integrated Estimation Model 118 (provided by combining Resource-Usage Estimation Models 116A and 116B). In doing so, the Resource Control System (RCS) 114 can compare Resource-Usage Estimation Models 116A and 116B to their corresponding actual data usage that can, for example, also be provided by the Data Monitoring and Analysis System (DMA) 104 and stored as the Actual Resource Usage Data (ARUD) for the Critical Time $t_1$, $t_2$ and $t_3$. In effect, access controls can be readjusted based on monitoring of actual usage of the computing resources in a loop-back mechanism where modeling of the resource-usage estimation models can also be continually readjusted prior to identified Critical Times. In addition, selection of the Selected Estimation Models (SEM) 110 and ultimately selection of a set of Target Computing Resource Features used to generate the Resource-Usage Estimation Models 116A and 116B can be continually made (or updated) based on more recently data actual usage data obtained from monitoring the computing system 101 and usage of its Computing Resources 102A and 102B.

Figure 2:
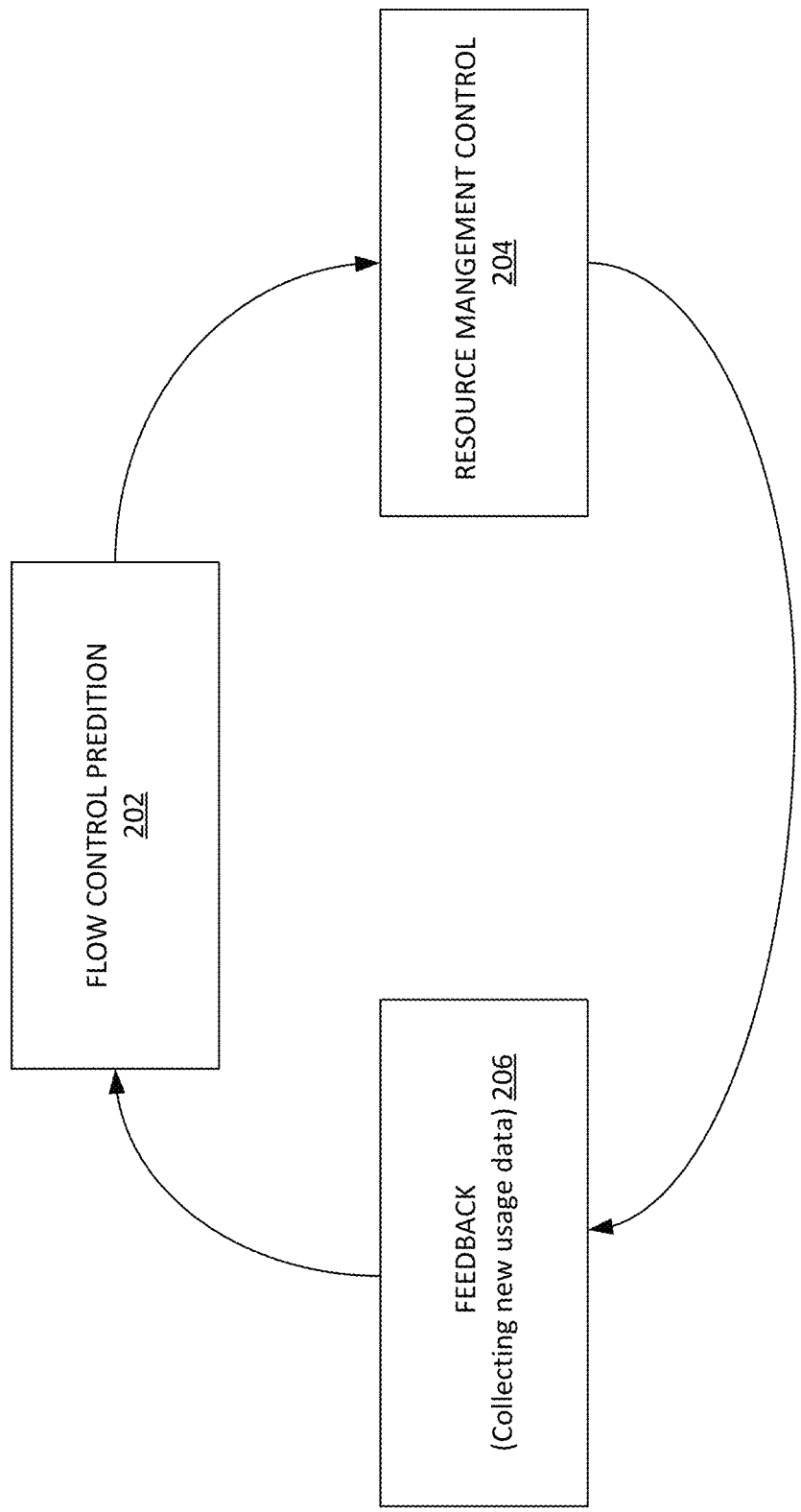
FIG. 2 depicts a Flow Control Prediction System, a Resource Management Control System, and a Feedback system in accordance with one embodiment.

To further elaborate, FIG. 2 depicts a Flow Control Prediction System 202, a Resource Management Control System 204 and a Feedback system 206 in accordance with one embodiment. The Flow Control Prediction System 202 can, for example, represent a prediction system that includes Resource Control System (RCS) 114 with or without the AI Modeling System (AIMS) 108 and Data Monitoring and Analysis System (DMA) 104 (Shown in FIG. 1)

Referring to FIG. 2, a Flow Control Prediction System 202 can provide predictions about the Critical Times in future when a bottleneck may occur. More particularly, for a Critical Time, the Flow Control Prediction System 202 can specifically predict which one of the Computing Resources could cause a bottleneck. Resource Management Control System 204 can use the information provided by the Flow Control Prediction System 202 to effectively adjust the flow control or access to each one of the Computing Resources (e.g., either a first computing resource, or a second computing resource, or both) for the Critical Time (or a duration of a critical time period as indicated by the information provided by the Control Prediction System 202). By way of example, a set of rules can be changed by a database workload manger. After flow control has been adjusted, a Feedback System 206 can monitor and collect new computing resource usage data for the indicated Critical Point and provide information as feedback back to the Flow Control Predication 202 so that it can use the actual measured resource usage data concerning the Critical Points (as provided in the feedback information) to make better predications or prediction models.

Figure 3:
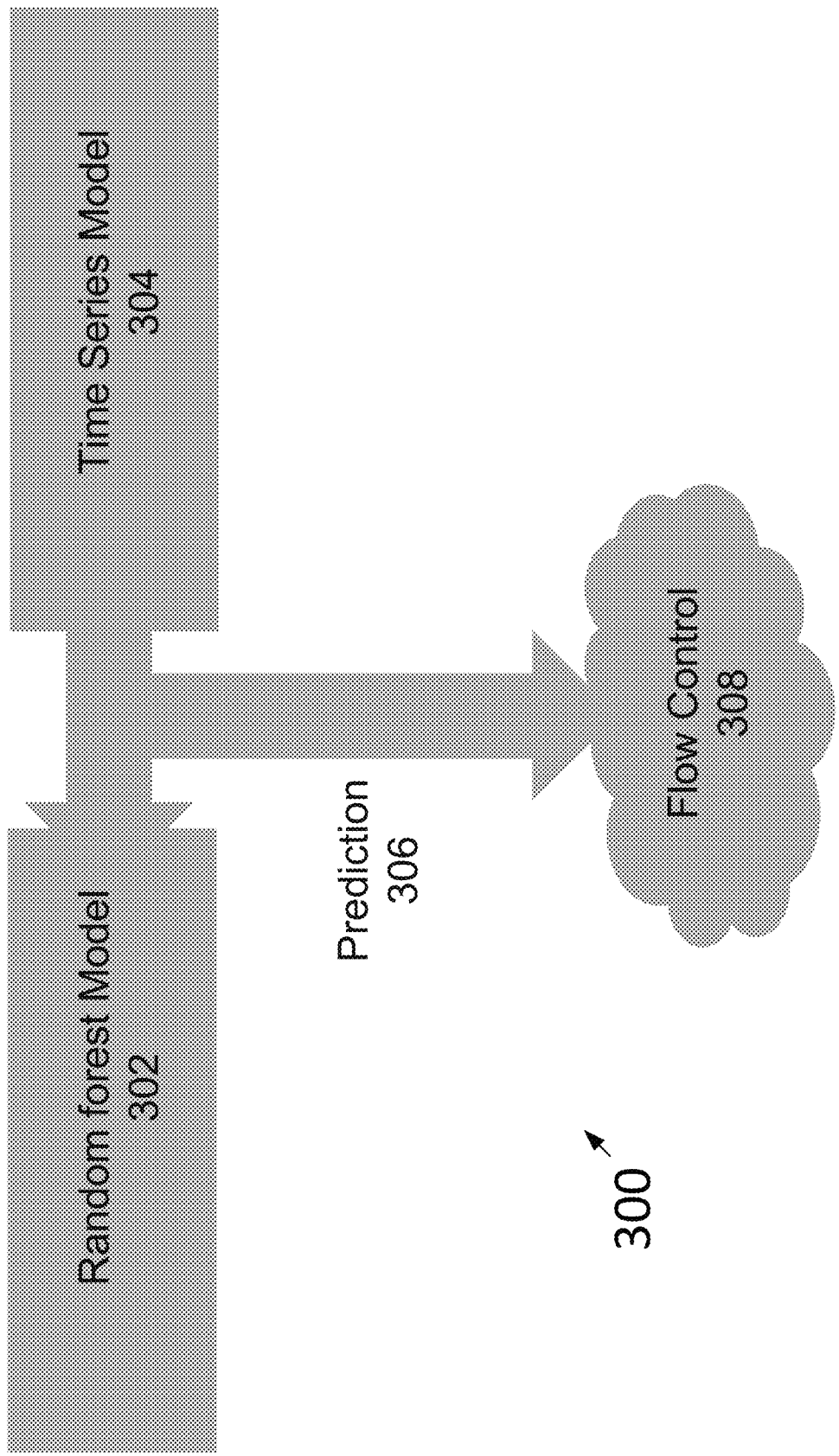
FIG. 3 depicts a flow control prediction system 300 in accordance with one embodiment.

To elaborate further, FIG. 3 depicts a flow control prediction system 300 in accordance with one embodiment. The Prediction system 300 depicts in greater detail the flow control prediction system 200 (shown in FIG. 2) in accordance with one exemplarily embodiment. Referring to FIG. 3, a Random Forest Model 302 and a Time Series Perdition Model 304 are collectively used as AI-based models to effectively generate and then provide prediction(s) 306 as information that can be provided to Flow Control 308 or to effectively control access to computing resources needed in a processing pipeline.

Figure 4:
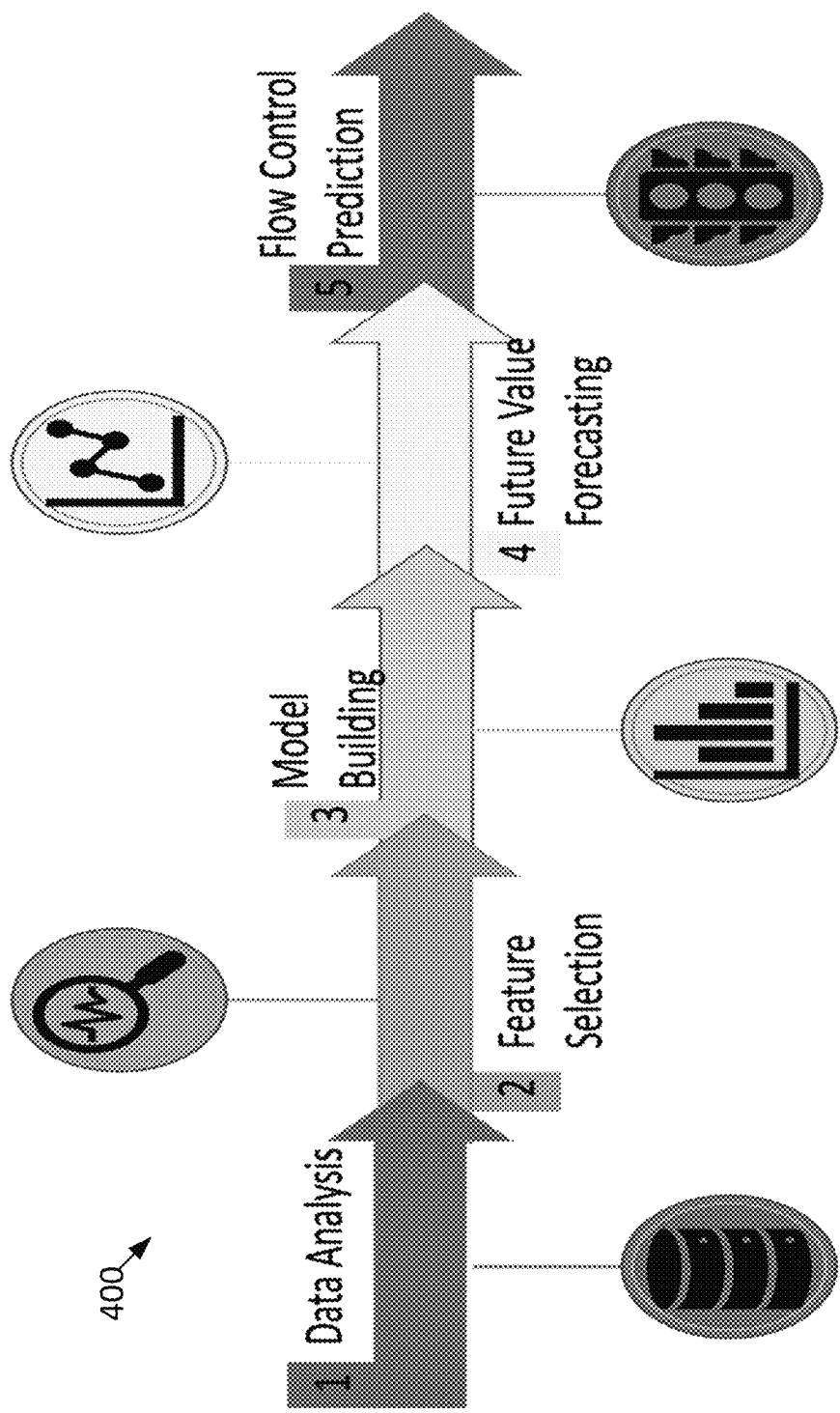
FIG. 4 depicts a process 400 for generating AI-based Flow Control predictions (or an AI Lifecyle) in accordance to one embodiment.

To elaborate even further, FIG. 4 depicts a process 400 for generating AI-based Flow Control predictions (or an AI Lifecyle) in accordance to one embodiment. Referring to FIG. 4, at a first phase, data analysis of monitored data can be performed. At a second phase, features of AI modeling can be selected. The selected features can be used to build AI models at the third stage. At a fourth stage, AI models can be used for future value forecasting. Finally, at a fifth stage, Flow Control Perditions can be made based on the future value forecasting.

Figure 5B:
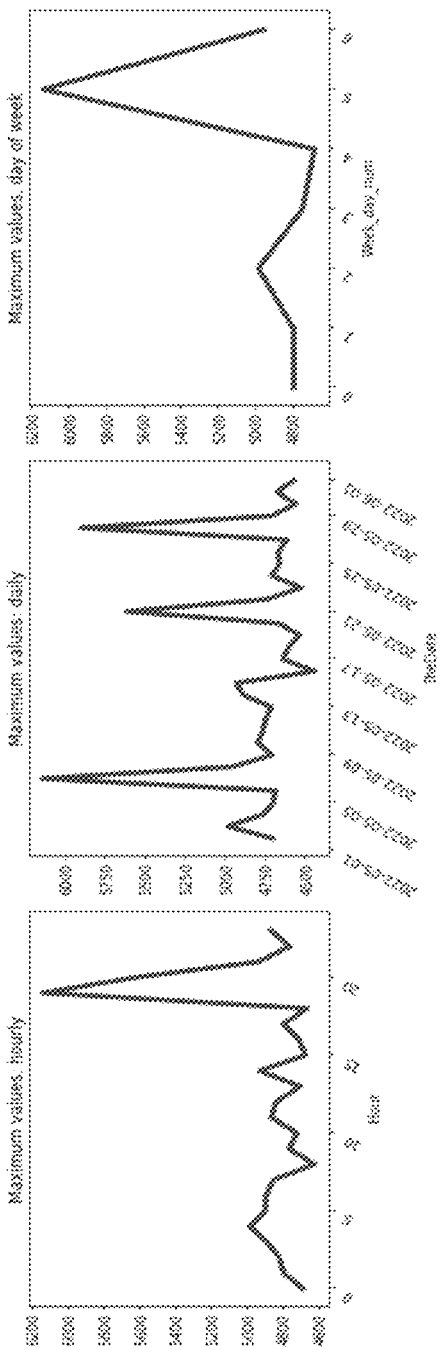

To further elaborate FIGS. 5A and 5B depict data analysis based on monitoring of a computing resource characteristic (or feature) of a processing resource that can be used as a feature in an AI-based modeling in accordance with one embodiment. In the example depicted in FIGS. 5A and 5B the computing resource feature is depicted as ("CPUOPSYS"). Referring to FIG. 5A, total values of actual measured usage for the feature "CPUOPSYS" are depicted for hourly basis, daily basis, and per days of the week basis, as an example. As another example, in accordance with another embodiment, FIG. 5B depicts patterns, or trends, in maximum values of actual measured computing resource usage for the feature "CPUOPSYS" for hourly, daily, and days of the week, as values corresponding to the total values of actual measured usage for the computing resource feature "CPUOPSYS," (shown in depicted in FIG. 5A). As such, FIGS. 5A and 5B can demonstrate by way of example, data analysis that can be performed for feature of computing resources in accordance with one or more exemplary embodiments.

Figure 6A:
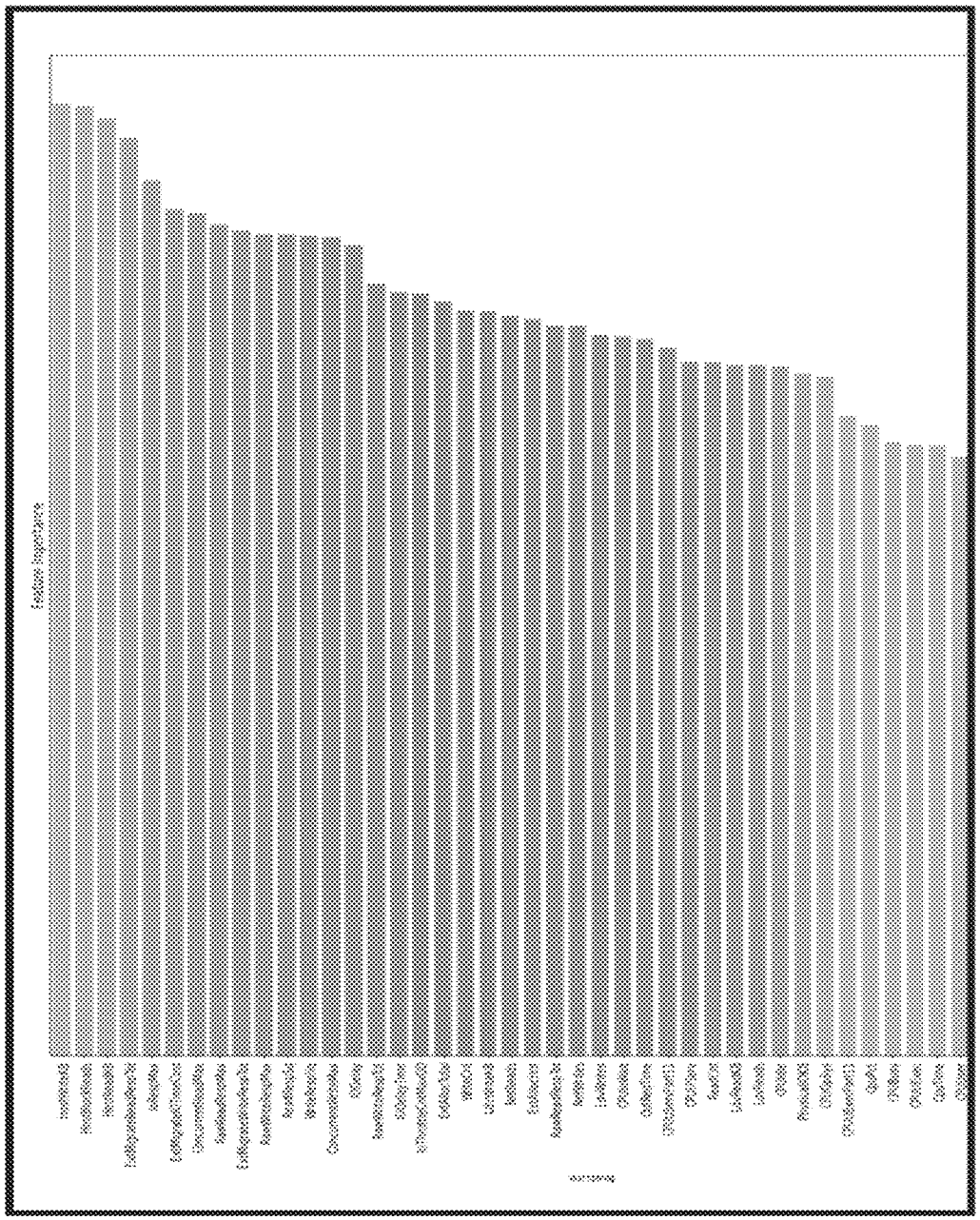
Figure 6B:
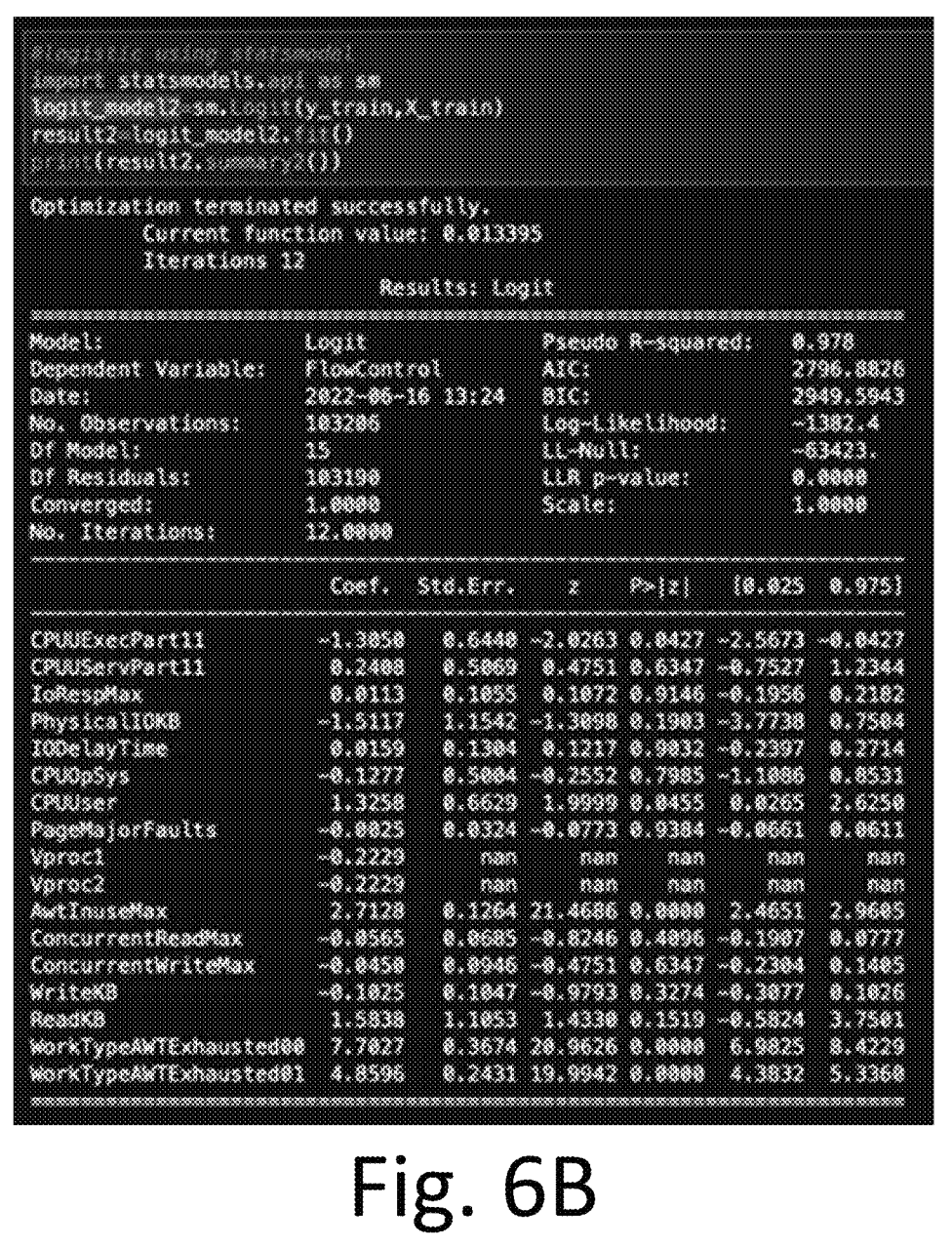

As noted above, the numbers of computing resource features in more complex database systems can exceed one hundred (100). By way of example, FIG. 6A depicts data analysis based on feature importance of a numbers of features in a more complex database system. The feature importance depicted in FIG. 6A can represent an initial phase of data analysis before additional data analysis is performed to choose a subset of the computing resource features.

Still more analysis can be performed to select one or more features from the subset of selected features for one or more AI-based modeling phase. For example, Logistic Regression on different sets of data collected on multiple days can be performed on computing resource features depicted in FIG. 6B, in accordance with exemplary embodiment. As a result, it can be determined that only a few of them have a Gaussian bell like distribution, for which Logistic regression can be determined and reviewed, for example, with their "P values" can be reviewed, and a "P Value" of 0.05 can be taken as a cutoff value. As such, features having less than the "P Value" of 0.05 can only be selected for further analysis.

Figure 6C:
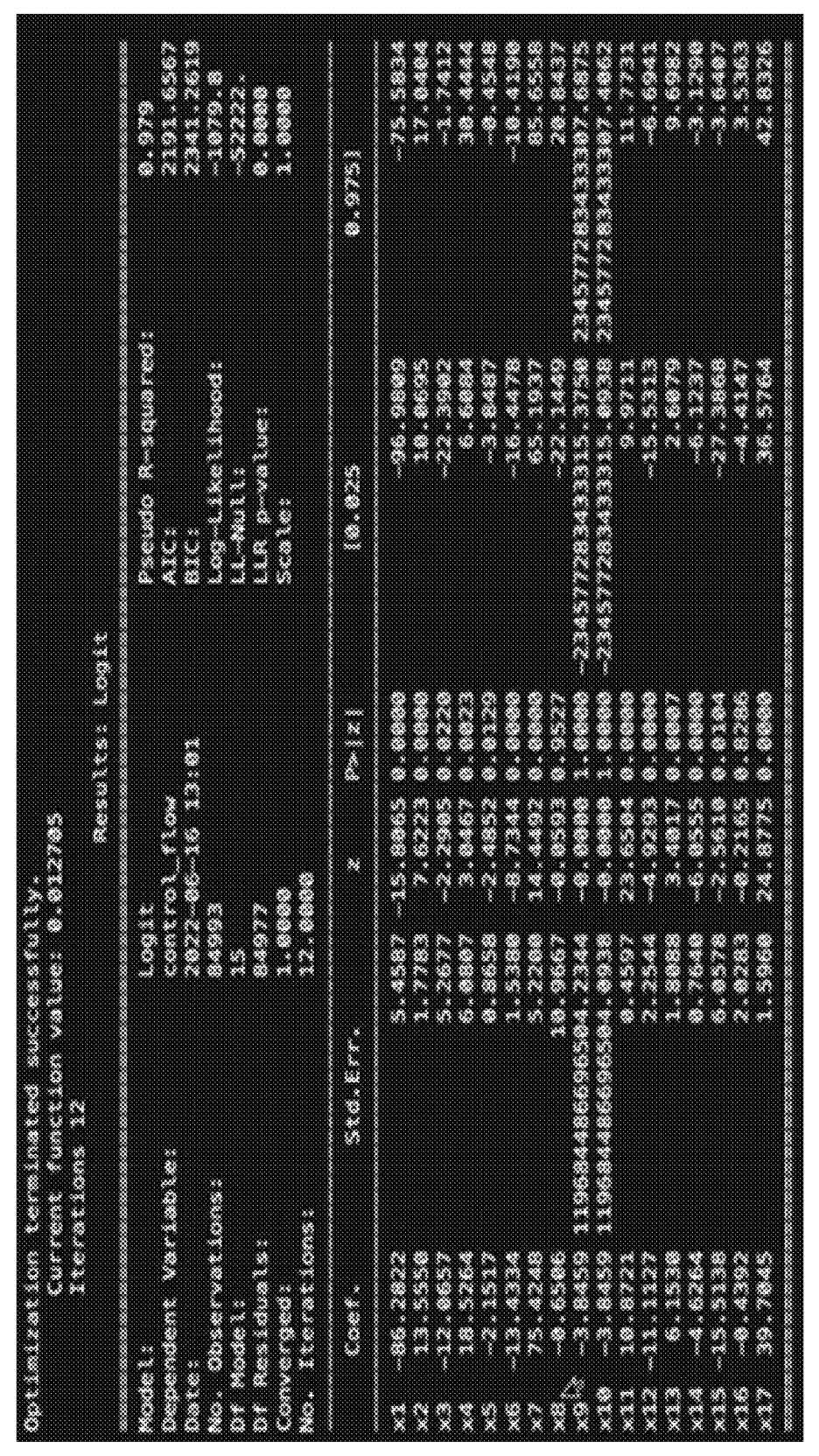

In the example, further Regression Modeling can, for example, deliver about a 50% accuracy. Data Normalization can then be used to enhance accuracy to about 90% and above. Thereafter, a model can give about a 99% accuracy, which can allow differentiation of features with less than 0.005 P Values, as depicted in FIG. 6C, in accordance with exemplary embodiment.

Figure 6D:
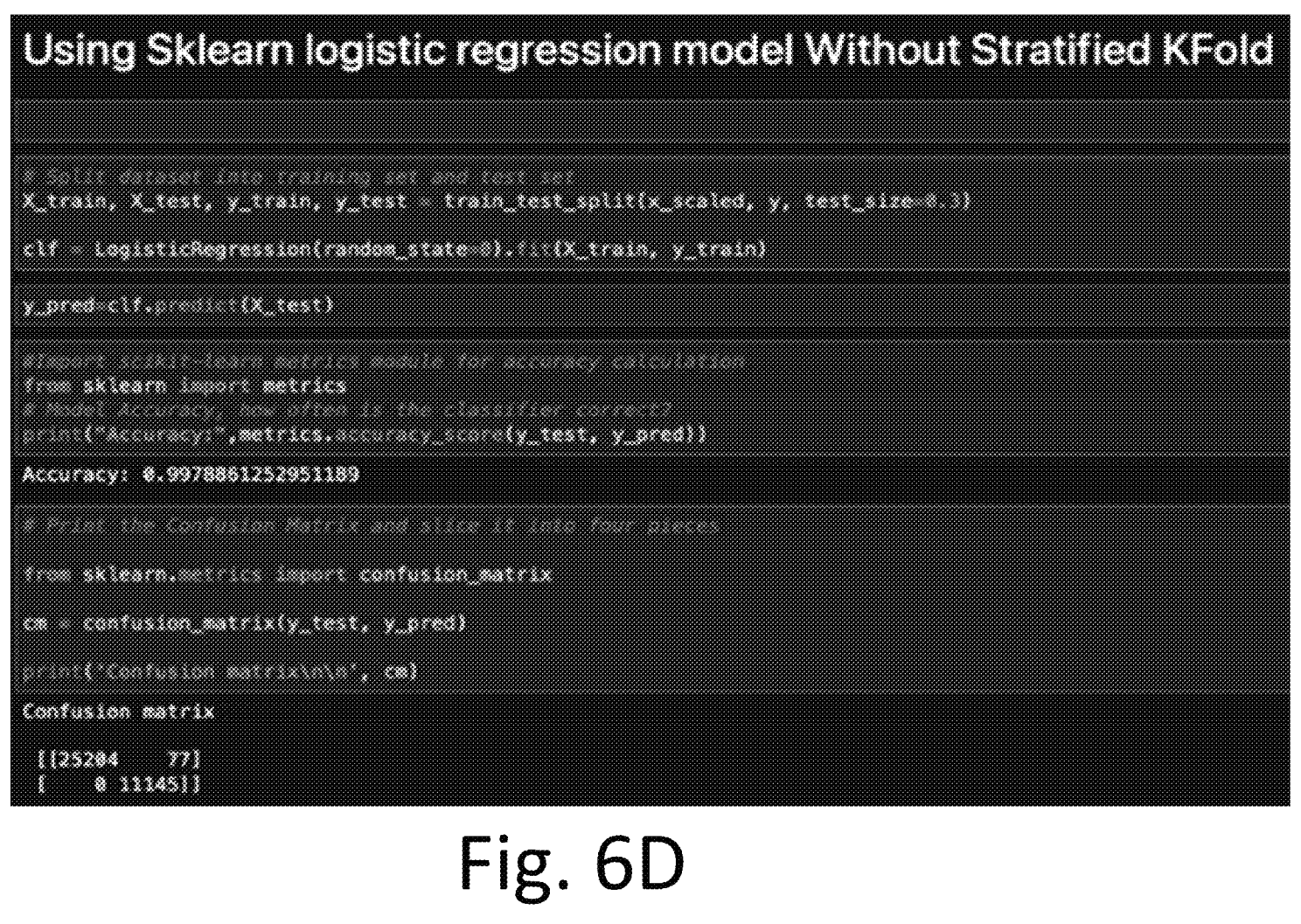

Furthermore, a "Confusion Matrix analysis (using Sklearn logistic regression modeling without Stratified Kfold) can also be used to confirm that, for example, two (2) classes representing two (2) features can show accuracy of about 99%, as depicted in FIG. 6D, in accordance with exemplary embodiment. As such, the two (2) identified features can be selected for predicting the Critical points in the Flow Control with a relatively highest accuracy (in comparison to other features that were not selected).

Figure 7:
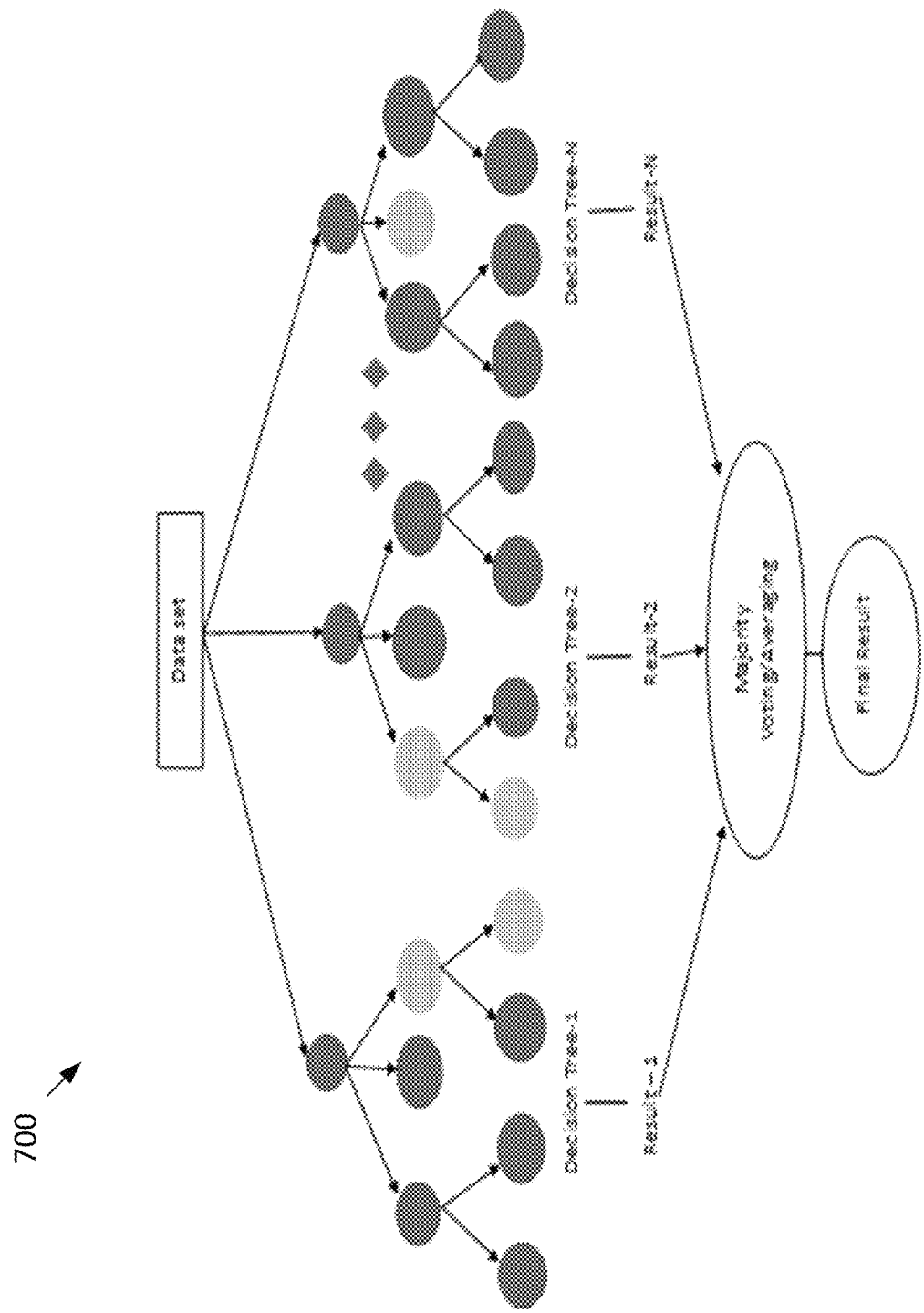
FIG. 7 depicts an AI-based modeling in accordance with one exemplary embodiment.

FIG. 7 depicts an AI-based modeling 700 in accordance with one exemplary embodiment. The AI-based modeling 700 can, for example, use a Random Forest Classifier of about one hundred (100) Classifiers with an expected accuracy of about 99.89% as will be appreciated by those skilled in the art.

Figure 8:
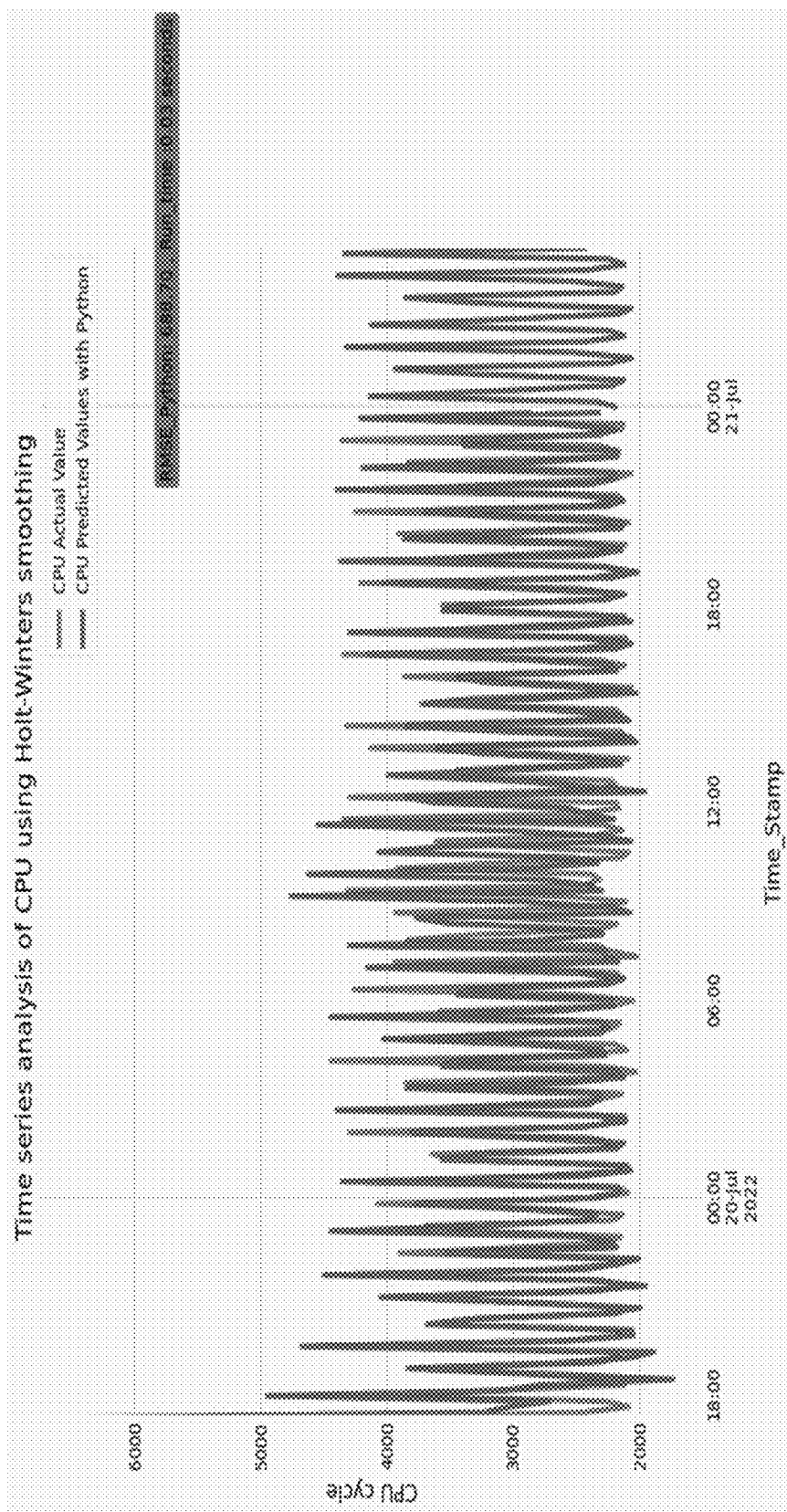
FIG. 8 depicts a time series analysis of a Central Processing Unit (CPU) as a computing resource using Holt-Winters smoothing implemented using "Python" libraries, in accordance with one embodiment.

FIG. 8 depicts a time series analysis of a Central Processing Unit (CPU) as a computing resource using Holt-Winters smoothing implemented using "Python" libraries, in accordance with one embodiment. Referring to FIG. 8, both the predicted and actual measured values of CPU cycles are provided on a time line where they can be compared, especially at predicted Critical Times to assess the accuracy of the present AI-based modeling.

Figure 9A:
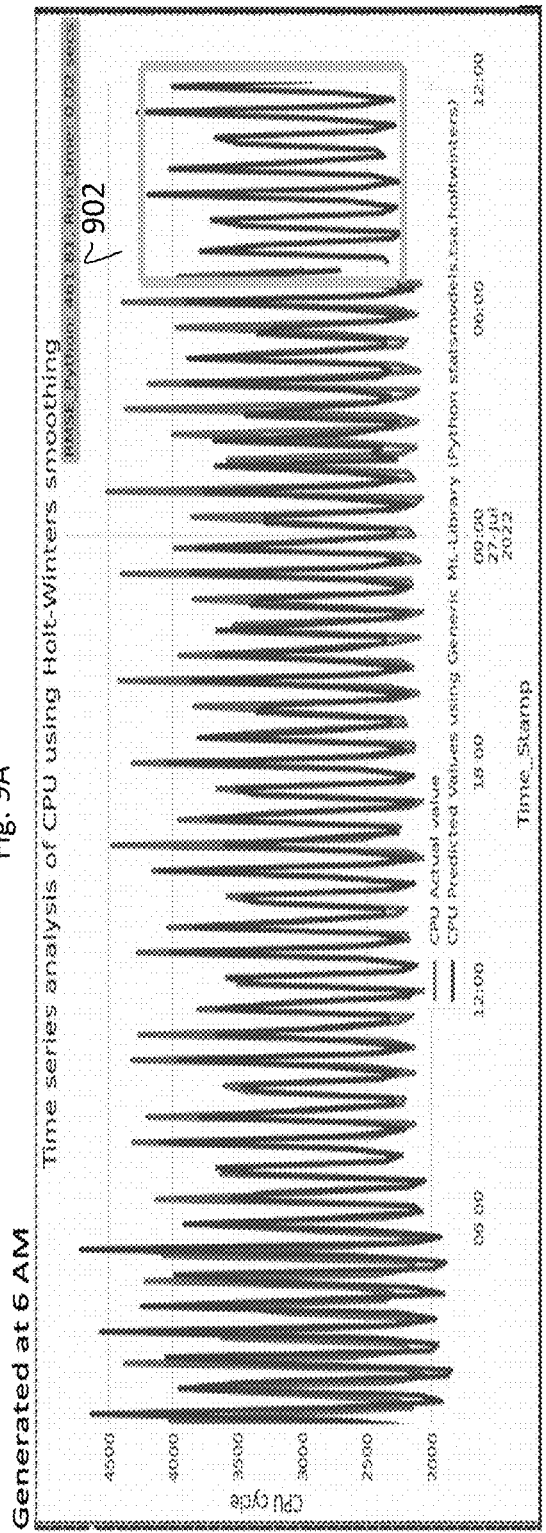
FIGS. 9A and 9B depict a prediction window on a time line in accordance with one exemplary embodiment.

FIG. 9A depicts a prediction window 902 in accordance with one exemplary embodiment. The prediction window 902 is at the far end of a time interval, shown between 06.00 and 12.00 for a particular day (Jul. 22, 2022). In this example, the current time (6 am) would be right at the start of the prediction window 902, so actual resource usage data is not available for the perdition window 902. However, for previous times, the actual measured resource usage data has been shown along with its predicted values. It should be noted that the actual measured resource usage data can be compared to the predicted values to effectively generate the prediction window 902 at the far end in a time interval between 06.00 and 12.00 for a particular day (Jul. 22, 2022).

Figure 9B:
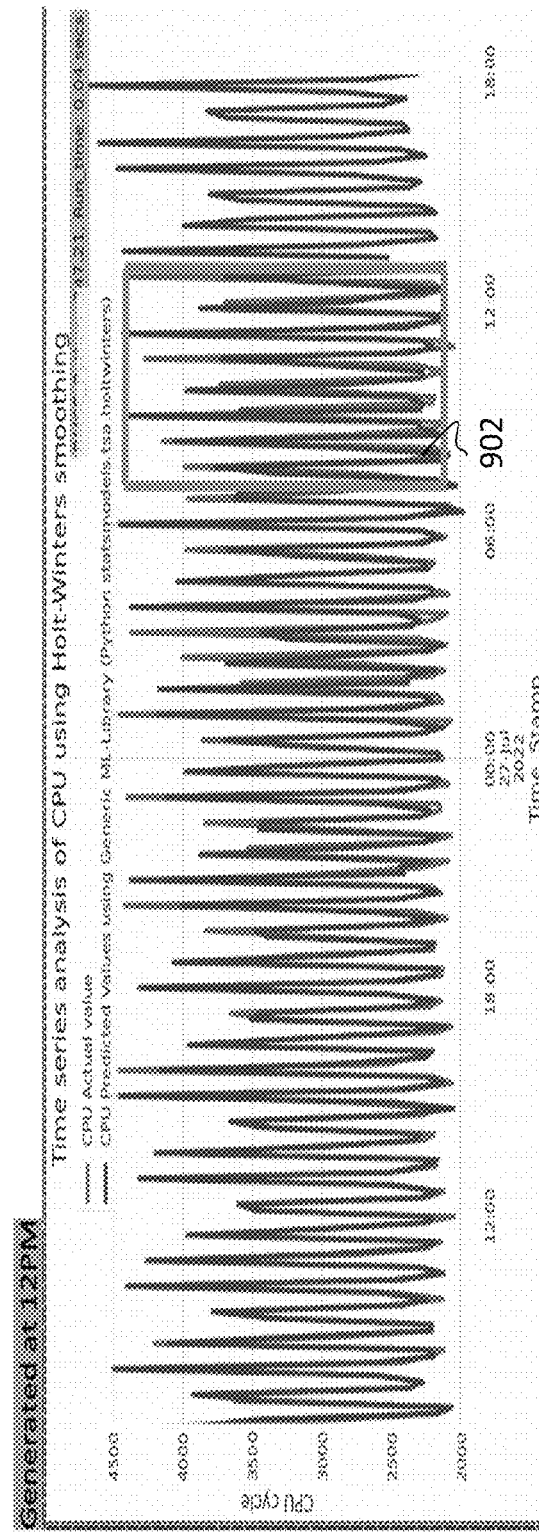

FIG. 9B depicts a time after the prediction window 902 (also shown in FIG. 8A) in accordance with one embodiment. Referring to FIG. 9B the end of the prediction window 902 at 12:00 for the for a particular day (Jul. 22, 2022) is depicted with new predictions for the upcoming time window, namely, time between 12:00 and 18:00 for the same day (Jul. 22, 2022).

Those skilled in the art will also appreciate that Phyton Libraries can, for example, be used to implement AI-modeling in accordance with one or more preferred embodiments as currently Phyton Libraries may provide relatively better accuracies at least for some database systems. However, other techniques (e.g., In Data Base Libraries of Teradata Management Systems) can also be utilized today and may provide similar or even better result in the future.

Currently, in some database environments (e.g., Teradata Active Data Warehousing environments) throttles and controls mechanisms (or engines)(e.g., Teradata Active Management (TASM) that can perform workload management in Teradata Database) can help overcome the impact of flow-control issues in order to maintain business-critical agreements and/or requirements (e.g., Service Level Agreements (SLAs)). The throttles and controls mechanisms may need to require a reactive manual deployment of most optimal ruleset for a situation, or a time-scheduled alternate (blind) pre-set ruleset activation, or a database administrator (DBA) responsible virtually around the clock for contingency management. These efforts need to be made to avoid "chocking" points in processing pipelines that can dramatically degrade processing of the database queries, resulting, for example, in not meeting Business and/or Engineering SLA's.

As such, it will be appreciated that the improved techniques can be used to provide an AI-based Process Optimization (AiPOP) and AI based TASM (AiTASM) extensions, to effectively eliminate forecast bottlenecks ahead of time and eliminate them to optimize the process pipeline and maintain SLAs requirements virtually around the clock.

In accordance with one aspect, a logical model (e.g., AiPOP, AiTASM) can be provided that is suitable for building Ai-Automation of virtually any core business process optimization. In one embodiment, a AiTASM can use logical model matching virtually any core business process measurements, controls & optimization, where: (i) Various process pipeline Resource Usage (or ResUsage) readings can identifyee availability of critical resources, (ii) Chokepoints (Flow-control) need to be avoided to achieve optimal process-pipeline throughput, (iii) Process throttles & controls (e.g., TASM rulesets in TASM in TD-ADW) can provide mechanism to increase or decrease various workflows in the process pipeline, (iv) a Feedback-Loop can use throttles & controls to adjust workflows, and in-turn, Resource-Usage, to eliminate forecasted Chokepoints in a timely manner before they can occur.

An AI-based Training and Forecasting system can be provided with a combination of a Classification Model and a Timeseries Model. The Classification Model can effectively forecast potential Flow Control (or "flowcontrol") critical points (or time points) by analyzing resource usage data. The Timeseries Model can forecast resources usage values for resources at the critical points, where models forecasting duration can be less than 0.25 seconds per iteration. In addition to the AI-based Training and Forecasting system with its Classification and a Timeseries Models, Ruleset Automation can effectively provide an integrated loop that automatically activates optimal rule sets (e.g., rule sets in TASM) in order to proactively avoid predicted "chokepoints" or issues with flow control in a processing pipeline. The feedback loop can effectively identify forecasted key pipeline resource-usage at Critical moments (Points-In-Time) and can uses throttles and controls (e.g., TASM) to proactively adjust pipeline workflow ahead of their materialization to avoid processing issues. This Framework cab iteratively retrain the models using live Resource Usage data readings (or measurements). New iterative forecasts can be made to reflect dynamic changes made in workloads and to reflect the impact of changes made to the throttles and control.

Logical Modeling, Analytical processing and Feedback-Loop automation can be applied in AI automation & optimization of virtually any business or engineering systems and/or environments. One or more of these components (and all of them) can be provided, for example, within a Database Management System (DBMS) that virtually provides all the required optimal analytical functions (e.g., in a TD-InDB library). In accordance with one embodiment, Generic "Python ML" libraries and its "TD-InDB" version can use matching and/or identical "InDB" library functions. In accordance with one aspect, an AI-based classification framework can be used to dynamically and iteratively analyze demand and supply measurements of dozens of process pipeline resources (or features) to precisely forecast "Choking points" ahead of their materialization. In an AI-based classification framework, dynamic retraining of multitier classifications and timeseries models can iteratively retrain AI-based models based on virtually live Resource Usage data readings, making newer forecasts that reflect dynamic changes in engineering and business pipelines.

Figure 10:
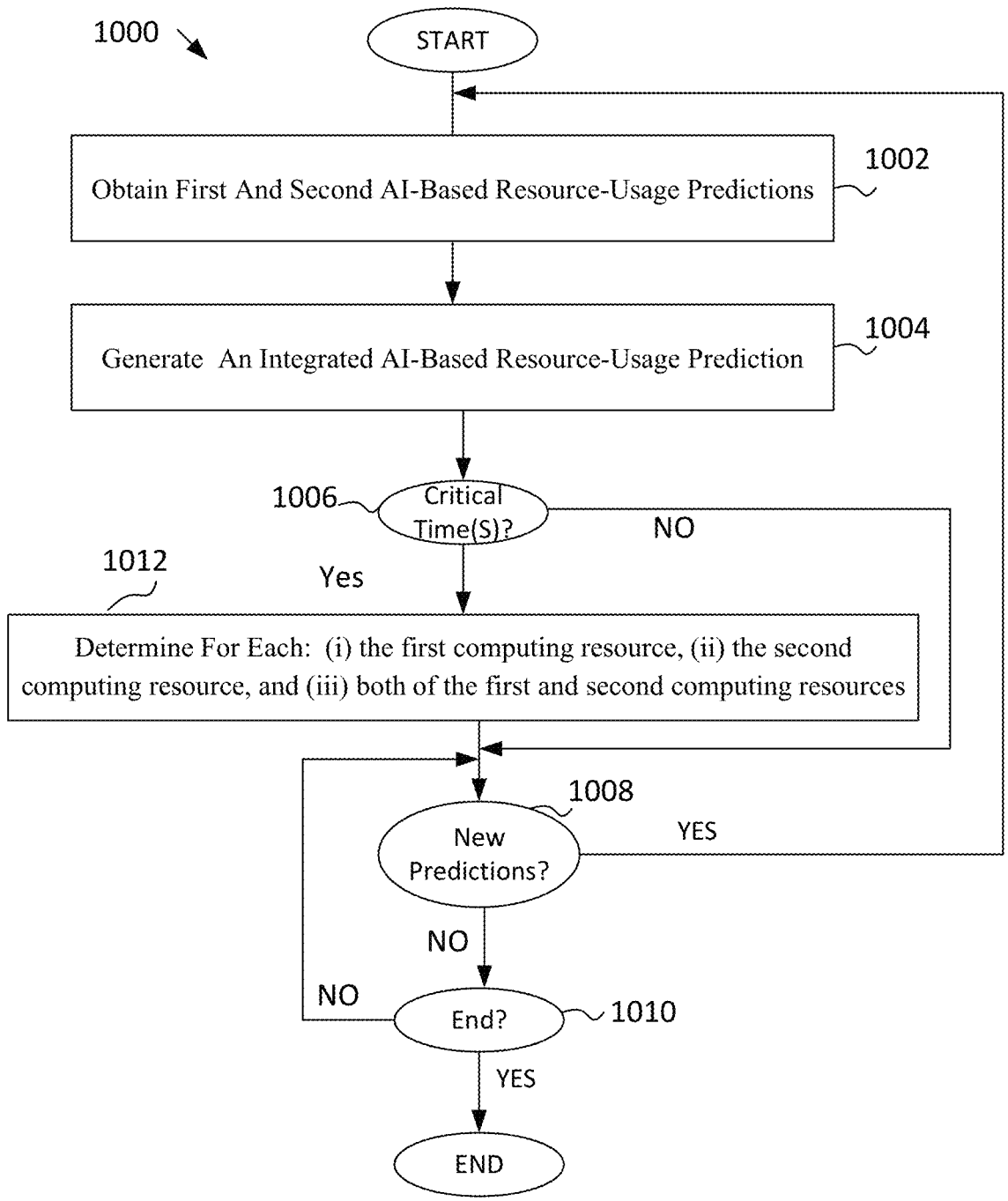
FIG. 10 depicts a method for managing computing resources of a computing system configured to process data in accordance with one embodiment.

To elaborate even further, FIG. 10 depicts a method 1000 for managing computing resources of a computing system configured to process data in accordance with one embodiment. It should be noted that the computing system can include first and second computing resources configured for processing of data by the computing system. Method 1000 can, for example, be performed by the Resource Control System (RCS) 114 (shown in FIG. 1).

Referring to FIG. 10, initially, first and second AI-based resource-usage predictions of usage are obtained (1002). It should be noted that the first AI-based resource-usage prediction of usage can be a prediction of usage of the first computing resource at a future time period. The first obtained (1002) AI-based resource-usage prediction can also be a prediction made based on estimation model modeled using Artificial Intelligence (AI) using at least one computing resource feature of the first computing resource. Similarly, the second obtained (1002) AI-based resource-usage prediction can also be a prediction made based on estimation model modeled using Artificial Intelligence (AI) but based on at least one computing resource feature of the second computing resource (not the first computing resource). The first and second AI-based resource-usage predictions can, for example, be Resource-Usage Estimation Models 116A and 116B (shown in FIG. 1) and obtained at the same or about the same time.

Next, the obtained (1002) first and second AI-based resource-usage predictions can be effectively combined on a time line that includes the future time period (period of time of the predictions) to generate (1004) an integrated AI-based resource-usage prediction as a prediction of usage of the first and second computing resources of the computing system at the future time period. Thereafter, it is determined (1006) at least partly based on the generated integrated AI-based resource-usage predictions, whether there would be at least one critical time in the future when at least one bottleneck in processing of the data by the computing system would occur. By way of example, it can be determined (1006) whether the generated integrated AI-based resource-usage predictions indicates that a desired threshold (predetermined or determined dynamically) would be exceeded at a time or for a time period. If there is no critical time can be identified (1006), method 1000 can determine (1008) if new predictions are available, it can effectively wait for them to become available unless it is determined (1010) to end the method 1000. As such, method 100 can continue to continue to obtain next predictions in similar manner as described above until it is determined (1010) to end method 1000, for example, as result of input received to end the method 1000.

However, if it is determined (1006) that at least one Critical Time in the future can be identified to cause a bottleneck in processing of the data by the computing, for each one of the identified Critical Times, it can be determined (1012) which one of the following would cause the identified bottle neck in processing of the data by the computing at the identified critical time in the future time period: (i) the first computing resource, (ii) the second computing resource, and (iii) both of the first and second computing resources. It should be noted that the information obtained by the determination (1012) can be used to adjust, prior to the critical time, one or more access controls of the first and/or second computing resources accordingly (not shown in FIG. 10).

This determination (1012) can, for example, be performed at least partly based on determining whether each one of the first and second computing resources exceed a threshold at a given Critical Time. The method 1000 can continue in a similar manner as described above until it is determined (1010) to end it.

Although not shown in FIG. 10, it should also be noted that after adjusting one or more access controls of one or more of the first and second computing resources, actual usage data of first and second computing resources can be measured for the period of time that was predicted by the predictions (integrated AI-based resource-usage predictions). The measured actual resource usage data can be compared with the predictions to adjust and/or readjust one or more access controls of either one or both of the first and second computing resources. In other words, previously adjusted access controls (in a previous cycle) can be readjusted or other access controls can be adjusted. The measuring of actual resource usage and comparing it with predictions for the same period of time can effectively generate feedback data.

It should also be noted that multiple usage predictions (or prediction models) of predicated usage of a computing resource can be generated for each one of set of resource features of multiple the computing resource, respectively, such that each one of the multiple usage models are modeled using Artificial Intelligence (AI) based modeling of the respective multiple resource feature. The generated predicated usage can then be compared to the measured actual usage for a time period or interval, for each one of the first and second resource features respectively associated with first and second computing resources. Thereafter, at least one of the resources features can be selected for its respective computing resources such that a selected feature matches a determined level of accuracy with respect to its corresponding measured actual data. For example, for each computing resources, a best matching feature can be identified on the basis that the selected resource most closely predicted its corresponding measured actual resource usage. The selected resource feature can be used to generate usage prediction models of predicated usage of its corresponding computing resource for future times or time intervals.

The various aspects, features, embodiments or implementations described above can be used alone or in various combinations. For example, implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile or near-tactile input.

Implementations of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described is this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method of managing computing resources of a computing system for processing data by the computing system, wherein the computing system includes first and second computing resources configured for processing of data by the computing system, and wherein the computer-implemented method comprises:
    obtaining a first Artificial Intelligence (AI)-based resource-usage prediction of usage as a prediction of usage of the first computing resource at a future time period, and wherein the first AI-based resource-usage prediction is prediction made based on estimation model modeled using Artificial Intelligence (AI) based on at least one computing resource feature of the first computing resource;
    obtaining a second AI-based resource-usage prediction of usage as a prediction of usage of the second computing resource at the future time period, and wherein the second AI-based resource-usage prediction is prediction made based on estimation model modeled using AI based on at least one computing resource feature of the second computing resource; and
    combining, on a time line including the future time period, the obtained first and second AI-based resource-usage predictions, to generate an integrated AI-based resource usage prediction as a prediction of usage of the first and second computing resources of a computing system at the future time period;
    determining, at least partly based on the generated integrated AI-based resource usage predictions, whether there would be at least one critical time in the future when at least one bottleneck in processing of the data by the computing system would occur during the future time;
    identifying at least one identified critical time in the future time period when the determining determines that there would be at least one critical time in processing of the data by the computing system would occur; and
    determining which one of the following would cause the bottleneck in processing of the data by the computing at the identified critical time: (i) the first computing resource, (ii) the second computing resource, and (iii) both of the first and second computing resources, when the determining determines that there would be at least one bottleneck in processing of the data by the computing at least at the identified critical time in the future time period.

2. The computer-implemented method of claim 1, wherein the determining which one of the following would cause the bottleneck in processing of the data by the computing at the identified critical time further comprises:
    determining whether at the identified critical time in the integrated resource-usage predictions of the first and second computing resources that a predicated usage of the first competing resource would exceed a first threshold; and
    determining whether at the identified critical time a predicated usage of the second computing resource would exceed a second threshold.

3. The computer-implemented method of claim 1, wherein the computer-implemented method further comprises:
    adjusting, prior to the identified critical time in the future, one or more access controls of the first computing resource when the determining determines that (i) the first computing resource would cause the bottleneck;
    adjusting, prior to the identified critical time in the future, one or more access controls of the second computing resource when the determining determines that (ii) the second computing resource would cause the bottleneck; and
    adjusting, prior to the identified critical time in the future, one or more access controls of each one of the first and second computing resources when the determining determines that (iii) the first and second computing resources would both cause the bottleneck.

4. The computer-implemented method of claim 3, wherein the computer-implemented method further comprises:
    after the adjusting, measuring the actual usage of the first and second computing resources at the critical time;
    comparing the actual resource usage of each one of the first and second computing resources to their respective predicted resource usage values at the critical time;
    determining, based on the comparing, whether to readjust access controls of at least one of the first computing resources, and the second computing resource;
    readjusting the access controls of the at least one of the first computing resource, and the second computing resource when the determining determines to readjust access control.

5. The computer-implemented method of claim 4, wherein the computer-implemented method further comprises:
    generating feedback data based on the comparing at least one predicate usage value to its corresponding measured actual usage value.

6. The computer-implemented method of claim 1, wherein the computer-implemented method further comprises:
    identifying at least one critical point where predicated resource usage of one or both of the first and second computing resources would each exceed a threshold value.

7. The computer-implemented method of claim 1, wherein the computer-implemented method further comprises:

generating, for a first-time interval, multiple usage models of predicated usage of the first computing resource for each one of a first set of resource features of the first computing resource, respectively, wherein each one of the multiple usage models are modeled using Artificial Intelligence (AI) modeling based on its respective resource feature in the first set of resource features;

measuring, at the first-time interval, actual usage of each one of the resource features of the set of the resource features the first computing resource, respectively;

comparing the generated predicated usage to the measured actual usage at the time interval, for each one of the first resource features in the first set of resource features of the first computing resource, respectively;

selecting at least one of the resource features in the first set of resource features as a first selected resource feature of the first computing resource.

8. The computer-implemented method of claim 1, wherein the first computing resource includes processing capacity of one or more processors of the computing system, and the second computing resource includes memory capacity of the computing system.

9. The computer-implemented method of claim 1, wherein the computing system includes a database management system configured to process database queries of a database.

10. The computer-implemented method of claim 9, wherein the database system management system includes a work load manager configured to manage workloads associated with the database queries of the database.

11. The computer-implemented method of claim 10, wherein the work load manager is configured to:
    adjust, prior to the identified critical time in the future, one or more access controls of the first computing resource when the determining determines that (i) the first computing resource would cause the bottleneck;
    adjust, prior to the identified critical time in the future, one or more access controls of the second computing resource when the determining determines that (ii) the second computing resource would cause the bottleneck; and
    adjust, prior to the identified critical time in the future, one or more access controls of each one of the first and second computing resources when the determining determines that (iii) the first and second computing resources would both cause the bottleneck.

12. A computing system that computing system configured to:
    obtain a first AI-based resource-usage prediction of usage as a prediction of usage of a first computing resource at a future time, and wherein the first Artificial Intelligence (AI)-based resource usage prediction is prediction made based on estimation model modeled using AI based on at least one computing resource feature of the first computing resource;
    obtain a second AI-based resource-usage prediction of usage as a prediction of usage of a second computing resource at the future time, and wherein the second AI-based resource-usage prediction is prediction made based on estimation model modeled using Artificial Intelligence (AI) based on at least one computing resource feature of the second computing resource; and
    combine, on a time line including the future time period, the obtained first and second AI-based resource-usage predictions, to generate an integrated AI-based resource usage prediction as a prediction of usage of the first and second computing resources of a computing system at the future time;
    determine, at least partly based on the generated integrated AI-based resource usage predictions, whether there would be at least one critical time in the future when at least one bottleneck in processing of the data by the computing system would occur during the future time period; and
    identify at least one identified critical time in the future time period when the determining determines that there would be at least one critical time when a bottleneck in processing of the data by the computing system would occur; and
    determine which one of the following would cause the bottleneck in processing of the data by the computing at the identified critical time: (i) the first computing resource, (ii) the second computing resource, and (iii) both of the first and second computing resources, when the determining determines that there would be at least one bottleneck in processing of the data by the computing at least at the identified critical time in the future time period.

13. The computing system of claim 12, wherein the computing system is further configured to:
    determine whether at the identified critical time in the integrated resource-usage predictions of the first and second computing resources that a predicated usage of the first competing resource would exceed a first threshold; and
    determine whether at the identified critical time a predicated usage of the second computing resource would exceed a second threshold.

14. The computing system of claim 12, wherein the computing system is further configured to:
    adjust, prior to the critical time in the future, one or more access controls of the first computing resource when the determining determines that (i) the first computing resource would cause the bottleneck;
    adjust, prior to the critical time in the future, one or more access controls of the second computing resource when the determining determines that (ii) the second computing resource would cause the bottleneck; and
    adjust, prior to the critical time in the future, one or more access controls of each one of the first and second computing resources when the determining determines that (iii) the first and second computing resources would both cause the bottleneck.

15. The computing system of claim 14, wherein the computing system is further configured to:
    after the adjusting, measure the actual usage of the first and second computing resources at the critical time;
    compare the actual resource usage of each one of the first and second computing resources to their respective predicted resource usage values at the critical time;
    determine, based on the comparing, whether to readjust access controls of at least one of: the first computing resources, and the second computing resource;
    readjust the access controls of the at least one of: the first computing resource, and the second computing resource when the determining determines to readjust access control.

16. The computing system of claim 15, wherein the computing system is further configured to:
    generate feedback data based on the comparing at least one predicate usage value to its corresponding measured actual usage value.

17. The computing system of claim 12, wherein the computing system is further configured to:
  identify at least one critical point where predicated resource usage of one or both of the first and second computing resources would each exceed a threshold value.

18. A non-transitory computer readable storage medium storing at least executable computer program code that when executed:
  obtains first and second Artificial Intelligence (AI)-based resource-usage predictions as predictions of usage of a first and a second computing resources at a future time in a computing system, respectively, determines, at least partly based on the obtained first and second AI-based resource-usage predictions, whether there would be at least one critical time in the future when at least one bottleneck in processing of the data by the computing system would occur during the future time; and
  identify at least one identified critical time in the future time when the determining determines that there would be at least one critical time when an identified bottleneck in processing of the data by the computing system would occur.

19. The non-transitory computer readable storage medium of claim 18, when the stored at least executable computer program code that when executed further:
  determines which one of the following would cause the identified bottleneck in processing of the data by the computing at the identified critical time in the future time period: (i) the first computing resource, (ii) the second computing resource, and (iii) both of the first and second computing resources, when the determining determines that there would be at least one bottleneck in processing of the data by the computing at least at the identified critical time in the future time period.

20. The non-transitory computer readable storage medium of claim 19, when the stored at least executable computer program code that when executed further:
  adjusts, prior to the identified critical time, one or more access controls of the first computing resource when the determining determines that (i) the first computing resource would cause the bottleneck;
  adjust, prior to the identified critical time, one or more access controls of the second computing resource when the determining determines that (ii) the second computing resource would cause the bottleneck; and
  adjust, prior to the identified critical, one or more access controls of each one of the first and second computing resources, respectively, when the determining determines that (iii) the first and second computing resources would both cause the bottleneck.

* * * * *